United States Patent [19]

Coyle et al.

[11] Patent Number: 4,475,682

[45] Date of Patent: Oct. 9, 1984

[54] PROCESS FOR REDUCING SERIES RESISTANCE OF SOLAR CELL METAL CONTACT SYSTEMS WITH A SOLDERING FLUX ETCHANT

[75] Inventors: R. T. Coyle, Lakewood; Joy M. Barrett, Eldorado Springs, both of Colo.

[73] Assignee: The United States of America as represented by the United States Department of Energy, Washington, D.C.

[21] Appl. No.: 374,675

[22] Filed: May 4, 1982

[51] Int. Cl.$^3$ .............................................. B23K 1/20
[52] U.S. Cl. .................................. 228/123; 228/124; 228/223
[58] Field of Search ........................ 228/123, 124, 223

[56] References Cited

U.S. PATENT DOCUMENTS

| | | | |
|---|---|---|---|
| 2,887,416 | 5/1959 | Jacobus et al. | 148/182 |
| 3,020,635 | 2/1962 | Redgrift | 228/180 R |
| 3,035,339 | 5/1962 | Matter et al. | 228/207 |
| 3,053,699 | 9/1962 | Irons et al. | 219/69 V |
| 3,295,196 | 1/1967 | Zaeschmar | 228/223 |
| 3,478,414 | 11/1969 | Potter | 228/223 |
| 3,482,755 | 12/1969 | Raciti | 228/34 |
| 3,484,929 | 12/1969 | Schroeder | 29/495 |
| 3,574,925 | 4/1971 | Schneider | 29/487 |
| 3,680,762 | 8/1972 | Kondo | 228/37 |
| 3,778,883 | 12/1973 | Bethsold | 29/495 |
| 4,019,671 | 4/1977 | Akyuerek | 228/123 |
| 4,196,839 | 4/1980 | Davis | 228/180 R |

OTHER PUBLICATIONS

Steve Hogan et al., "Evaluation of Thick-Film Inks for Solar Cell Grid Metallization", (Solar Energy Research Institute, a Division of Midwest Research Institute, Golden, Colorado 1981.

YAntonucci et al., "Prefluxing Semiconductor Chips", IBM Technical disclosure Bulletin, vol. 21, No. 6. p. 2426, 11/1978.

*Primary Examiner*—Kuang Y. Lin
*Attorney, Agent, or Firm*—Kenneth L. Richardson; John M. Albrecht; Michael F. Esposito

[57] ABSTRACT

Disclosed is a process for substantially reducing the series resistance of a solar cell having a thick film metal contact assembly thereon while simultaneously removing oxide coatings from the surface of the assembly prior to applying solder therewith. The process includes applying a flux to the contact assembly and heating the cell for a period of time sufficient to substantially remove the series resistance associated with the assembly by etching the assembly with the flux while simultaneously removing metal oxides from said surface of said assembly.

11 Claims, No Drawings

PROCESS FOR REDUCING SERIES RESISTANCE OF SOLAR CELL METAL CONTACT SYSTEMS WITH A SOLDERING FLUX ETCHANT

CONTRACTUAL ORIGIN OF THE INVENTION

The United States Government has rights in this invention pursuant to Contract No. EG-77-C-01-4042 between the United States Department of Energy and the Midwest Research Institute.

BACKGROUND OF THE INVENTION

1. Field of the Invention

The invention relates generally to solar cells and pertains, more specifically, to a process for reducing the series cell resistance associated with thick film, electrical, metal contact systems of solar cells utilizing a soldering flux etchant.

2. Description of the Prior Art

In recent years the development of solar cell technology for terrestrial applications has accelerated rapidly. Solar cells may be generally defined as photovoltaic devices that directly convert sunlight into electrical current. The rapid development in terrestrial solar cell technology is due in part to the realization that the supply of hydrocarbon fuels, while fairly large, is not inexhaustible. Another factor that has contributed to the rapid development of this technology is the increasing concern about air and water pollution resulting from the burning of hydrocarbon fuels, as well as an increasing concern about a possible hazard connected with the use of nuclear fuels.

The recent development and growth of terrestrial solar cell technology has presented a need for producing low cost cells with fairly high efficiencies at a rather large rate. To meet this need, the solar cell industry has generally concentrated on producing sheets or films of low cost semiconductor materials from which the finished cells are fabricated, producing inexpensive processing methods for forming new types of solar cell junctions, and developing new types of cost-effective solar cell metallization processes. With regard to developing new metallization processes, thick film, metallization technology is currently recognized as a potentially cost-effective process for applying electrical metal contacts to the surfaces of various types of silicon solar cells.

Thick film technology may be broadly defined as that field of microelectronics in which specially formulated thick film inks are applied onto a ceramic or semiconductor substrate. The inks are applied in a definite pattern and sequence to produce a set of individual electrical components, such as, for example, resistors, capacitors, a complete functional circuit, or as in the case of solar cell metallization, back and front metal contacts. Conventional inks typically are high viscosity thixotropic pastes containing dielectric oxide, metal or ferroelectric oxide powders and a low softening glass frit or melted glass composition which is intermixed with an organic vehicle.

The inks are normally applied using a screen or mask method. When using the screen method with solar cells, the ink is usually forced through pre-processed openings in a stencil screen to deposit the required thick film contact pattern or system onto the semiconductor substrate. After depositing the contact pattern, the resultant thick film metal contact system is fired at elevated temperatures in either a periodic kiln or a belt furnace so as to mature the deposited contact system and to chemically bond the system integrally to the substrate.

The chemical bonding of the ink pattern to the substrate is facilitated by the frit contained in the ink and a sintering operation which occurs during firing. During sintering, the screened contact system is fired at a temperature sufficient to produce a coherent mass but less than that required to produce complete fusion. Additionally, during sintering the frit softens and flows to form a glaze-like glass film at an interface between the fired ink contact system and the substrate so as to bond the metal oxide powders of the ink to the substrate.

In addition to thick film technology providing a potentially cost-effective metallization process, it offers the advantage of providing a means for depositing the metal contacts onto the newly produced semiconductor cell only at positions where such contacts will be used. It also offers the advantage of providing a metal contact system of sufficient thickness to allow fairly high conductivity, as well as for providing a system that is substantially resistant to degradation by the terrestrial environment, is strongly adherent, that is easily automated.

Unfortunately, with respect to thick film solar cell metallization applications, the glaze-like glass film formed at the interface between the fired contact system and the cell substrate serves as a barrier for electron flow therebetween. This barrier creates an undesirable high contact resistance.

Contact resistance may be simply defined as the electrical resistance between the contact system and the cell surface. Since the contact resistance is one of the various sources or components of series cell resistance, an undesirable high contact resistance usually creates a corresponding undesirable high series cell resistance. The effect of the high series resistance is an undesirable flattening of the solar cell output characteristics and a related drop in its maximum power point voltage. Consequently, the high contact resistance created by the glass film barrier constitutes a severe disadvantage of the aforesaid metallization process.

Various approaches have been utilized by skilled technologists in the thick film, metallization, solar cell industry to reduce such contact resistance formed by the glass barrier, and thus to reduce the series resistance associated therewith. One approach commonly employed to reduce the series resistance is to etch the metal contact system with about 5% by weight of a hydrofluoric acid-type etchant for up to about 10 seconds almost immediately after firing. This approach makes use of the well known fact that the power output characteristics of a freshly fired solar cell are usually always undesirably low. However, upon etching with the hydrofluoric acid, the power output without exception is nearly always improved to satisfactory levels.

A serious drawback, however, with the acid etchant approach is that it introduces an extra process step to the conventional thick film metallization process, as well as additional equipment and labor normally required to accomplish the etching. Moreover, hydrofluoric acid-type etchants are extremely corrosive and hazardous, and thus must be handled carefully. For example, etching with hydrofluoric acid must be strictly controlled with respect to time.

Such control is required because the acid may substantially destroy the glaze-like glass film at the interface between the contact system and the cell substrate if the etching is performed for longer than a critical time.

Destroying the glass film also undesirably destroys the adhesion created thereby. The requirement for controlling the time of the etch is complicated by the fact that for each ink an optimum etch time must be determined. The optimum etch time must be long enough to improve the cell output without destroying the adhesion formed by the frit. Additionally, a thorough washing of the cell is required after every hydrofluoric etching cycle to remove unwanted residue. Hence, for the aforesaid reasons the extra hydrofluoric acid etching operation is costly and undesirably time consuming.

Another prior art approach is to formulate the thick film ink composition having a minimum amount of frit contained therein. A significant shortcoming of formulating such a composition is that the resulting metal contact system is often marginally adherent.

Yet another prior art approach is to fire the screened thick film contact system using an infrared furnace. Using an infrared furnace for the firing cycle substantially decreases the firing time and causes less glass flow to the interface. Decreasing the firing time and causing less glass flow normally causes the contact resistance to be significantly reduced. However, utilizing an infrared furnace to fire the screened contact system also usually results in forming a contact system that is marginally adherent when exposed to the atmosphere. Additionally, the infrared approach requires a fairly costly expenditure for the infrared furnace.

The failure to solve satisfactorily the long-standing problem of the series resistance with the aforesaid prior art approaches has created an additional need either to offset or to reduce the cost of hydrofluoric acid etching or to find new or improved series resistance reduction techniques. Skilled theoreticians and researchers in the solar cell industry have addressed this latter need by reinvestigating solar cell manufacturing process operations.

The major manufacturing operations under investigation generally include the production and doping of semiconductor wafers, the fabrication of thick film metal contact systems, the application of hydrofluoric acid-type etchants, the fabrication of reflective coatings, and lastly, the packaging of metallized cells to form photovoltaic modules. Of the above operations, familiarity with hydrofluoric acid etching and packaging operations is required in order to appreciate fully the improved process of the present invention. The reasons for this requirement are twofold. First, the process of the present invention was developed out of theoretical and applied research on these by the applicants operations. Second, the process contemplates eliminating the hydrofluoric acid etching operation and altering the packaging operation in order to cope with the aforesaid need to reduce the undesirable cost associated with acid etching, as will be more fully explained hereinafter.

In conventional acid etching practices, as previously mentioned, the contact system is frequently etched with a hydrofluoric acid-type etchant and tested for its electrical characteristics by device engineers and technologists. In conventional packaging practices, packaging engineers and technologists normally electrically connect the metal contacts to other portions of the electrical system. Since the interconnection of the cells is primarily and routinely accomplished through soldering, it constitutes an important step thereof.

Conventional soldering, generally speaking, involves joining metals without using fasteners by employing a nonferrous metal whose melting point is below that of the base metal. The major soldering operations for thick film solar cell packaging typically involve initially cleaning the fired thick film solar cell by burnishing or applying a solvent cleaner. Cleaning is ordinarily followed by fluxing which involves removing oxide coatings and other contaminants from the metal surfaces to be assembled and lowering surface tensions of the solder, whereby the wetting or adhesion properties of the solder are increased. The next step is usually tinning. Tinning typically involves precoating the contact system with solder through either a solder dip or a solder wipe method. Lastly, the pretinned parts are usually heated and joined to one another without applying additional solder in a technique generally known as reflow assembling.

The present invention, as aforesaid, contemplates altering the soldering operation by employing a soldering flux, instead of hydrofluoric acid, as an etchant during the soldering cycle to reduce the series resistance. Heretofore, whenever an acid type etchant was used, the system was nearly always etched immediately following the earlier firing and metallization cycles of solar cell manufacture, as will be more fully explained hereinafter.

Prior art patents relating to the use of soldering fluxes in semiconductor manufacture, although not as an etchant to reduce the contact resistance formed by frit during sintering in the manufacture of thick film metallization solar cells, include U.S. Pat. Nos. 4,019,671; 3,574,925; 3,478,414; 3,295,196; 3,020,635; and 2,887,416. Additionally, some prior art patents relating to the soldering process used in the fabrication of printed circuit boards and other circuit systems include U.S. Pat. Nos. 4,196,839; 3,778,883; 3,680,762; 3,553,824; 3,484,929; 3,482,755; 3,053,699; and 3,035,339.

SUMMARY OF THE INVENTION

Against the foregoing background, it is a general object of this invention to provide an improved process for reducing the series cell resistance associated with the contact resistance of, solar cell, thick film metal contact systems which process overcomes the disadvantages and shortcomings of the aforesaid prior art approaches to reducing this resistance.

It is a more specific object to provide a low cost process for reducing the series cell resistance associated with the contact resistance of thick film, solar cell, metal contact systems, which process eliminates the need for etching the systems with a hydrofluoric acid type etchant as well as the associated equipment and labor required to accomplish such acid etch.

It is another more specific object to provide an improved process for reducing the series cell resistance associated with the contact resistance of thick film, solar cell, metal contact systems to provide satisfactory electrical characteristics that are substantially equal to the satisfactory electrical characteristics obtained by etching such contact systems with a hydrofluoric acid-type etchant.

To accomplish the foregoing objects and advantages, the present invention comprises a process for substantially reducing the series resistance of a solar cell having a thick film metal contact system thereon while simultaneously removing oxide coatings from the surface of the assembly prior to applying solder therewith. The process includes applying a flux to the contact assembly and heating the cell for a period of time sufficient to reduce substantially the series resistance associated with the assembly with the flux while simultaneously removing metal oxides from the surface of the assembly.

Additional objects, advantages and novel features of the present invention will be set forth in part in the detailed description which follows, and in part will become apparent to those skilled in the art upon examination of the following description or upon practicing the invention. The objects and advantages of the invention may be realized and attained by means of the elements and manipulative steps particularly pointed out in the appended claims.

DESCRIPTION OF THE PREFERRED EMBODIMENTS

The present invention contemplates an improved process for reducing the series cell resistance associated with thick film, metal contact or conductor systems of solar cells by employing a soldering flux as both an etchant and as a fluxing agent during the soldering operations. As previously mentioned, in conventional solar cell manufacture, acid etching of solar cells to reduce the series cell resistance is virtually always accomplished utilizing hydrofluoric acid-type etchants immediately following the metallization and firing stages of manufacture.

Additionally, heretofore, the primary purpose of utilizing a soldering flux subsequent to etching with hydrofluoric acid is to remove the metal oxides from the contact surfaces and to facilitate the wettability thereof.

However, the present invention contemplates another primary purpose or way in which to use the soldering flux. To this end, it is reiterated that the soldering flux is uniquely used in the present invention as an etchant during the latter soldering cycle to etch the glaze-like glass film formed by the frit during sintering, as well as a means to contemporaneously remove the metal oxides and other contaminants from the surfaces of the parts to be soldered.

It will be understood that the discovery of the present invention, that is to say the use of the soldering flux both as a fluxing agent and a soldering flux etchant, arose out of extensive theoretical and applied research by the applicants on the problem of understanding exactly how a post-hydrofluoric acid-etch provides improved cell performance. Although, as previously mentioned, it is well known among skilled solar cell technologists that etching a fired thick film contact system with hydrofluoric acid reduces the series resistance and improves cell efficiency, the precise mechanism by which the electrical conductivity characteristics are changed by such etching is presently not fully understood.

The research by applicants indicated that one possible mechanism for explaining post-acid-etch increases in cell performance and reductions in series resistance is that the hydrofluoric acid attacks or dissolves the glaze-like glass film at the periphery of the metal contact system in a manner to provide improved cell performance. This possible explanation is significantly important because the glaze-like glass film is known to essentially comprise melted glass. The prime constituents of this glass are normally metal oxides. Hence, it was reasoned that the soldering flux might possibly act to attack these metal oxides so as to reduce the resistance and to improve the cell performance in a manner somewhat similar to the aforesaid way in which it is believed that the hydrofluoric acid acts to attack the oxides and to provide improved performance.

Thus, additional research was conducted to determine if the soldering flux could be used as an etchant during the latter soldering stages to effectively reduce the series resistance, whereby the etching cycle could be integrally incorporated into the soldering cycle so as to eliminate the costly acid etching operation. The results of this latter research indicate that a soldering flux could be used both as an etchant and as a fluxing agent. Moreover, this research also indicates indicated that the resulting post-soldering flux-etch improvements were substantially similar to those improvements obtained when utilizing a hydrofluoric etchant immediately following the firing cycle, as will be more fully explained hereinafter. However, it will be noted that this research did not fully explain the precise manner by which the post soldering flux-etch provided the improved cell performance. That is to say, this research does not fully explain the conduction mechanism within the soldering flux and solar cell metal contact system by which the electrical conductivity characteristics change subsequent to the attack on the glass film.

In view of the above described manner by which the process of the present invention was discovered, it will now be appreciated that the use of a soldering flux both as an etchant and as a fluxing agent will not be readily apparent to device engineers who normally etch and test the contact system for its electrical properties immediately after firing. Similarly, such a use will also not be readily apparent to packaging technologists who normally only solder and package previously acid etched cells.

To the accomplishment of using the flux both as an etchant and as a fluxing agent, any well known organic or inorganic soldering flux suitable for removing oxide coatings in solar cell manufacturing applications may be employed as an etchant. The organic fluxes include, for example, the common rosin fluxes and the amine fluxes, while typical inorganic fluxes include zinc chloride, ammonium chloride and acids such as hydrofluoride. Notably, the particular type of flux utilized depends on a number of factors, such as for example, the type of metal being soldered and the type of solder being employed to effect assembly.

However, three preferred types of soldering fluxes which may be used as etchants are Kester 1587, Kester 2331 and Kester 817. Kester 1587 is a trademark for an activated rosin flux. Kester 2331 is a trademark for a highly water soluble organic flux. Kester 817 is a trademark for a fairly strong inorganic flux, which is particularly useful for thick film inks that are resistant to etching. All of these fluxes are marketed by Kester Solder Inc., in Chicago, Illinois. Kester 817 comprises zinc chloride and hydrocholoric acid dissolved in water. Kester 1587 comprises a water white rosin flux dissolved in an alcohol. Kester 2331 comprises a nonacidic organic water soluble flux dissolved in alcohol.

The zinc chloride content of the Kester 817 flux composition is about 40% by weight of the total composition. The hydrochloric acid content of the Kester 817 flux composition is about 5% by weight of the total composition. The remainder of the Kester 817 flux composition is substantially made up of water and minor ingredients. The minor ingredients substantially include wetting agents and constitute about 1% by weight of the total composition.

The alcohol utilized in the Kester 1587 flux composition preferably comprises isopropyl alcohol. The isopropyl alcohol content of the Kester 1587 flux composition is about 75% by weight of the total composition. The water white rosin content of the Kester 1587 flux composition is about 24% by weight of the total composition. The remainder of the Kester 1587 composition is made up of minor ingredients which include amine hydrohalide activators and wetting agents. The minor ingredients are about 1% by weight of the total composition.

The principal ingredients of the Kester 2331 flux composition include isopropyl alcohol, acetic acid, polyalkane glycols, organic acids, amine hydrochloride, and wetting agents. The isopropyl alcohol content of the Kester 2331 flux composition is about 65% by weight of the total composition. The acetic acid content of the Kester 2331 composition is about 2.5% by weight of the total composition. The remainder of the composition is made up of the polyalkane glycols, the organic acids, the amine hydrochloride, and the wetting agents. The amine hydrochloride and wetting agents comprise minor ingredients in the composition and make up about 1% by weight of the total composition.

The aforementioned soldering fluxes may be employed as an etchant with any number of various solar cell semiconductor substrates having thick film metal contact systems fabricated thereon. However, the preferred type of cells to be used with soldering flux etchants are thick film terrestrial silicon solar cells.

To practice the process of the present invention, the metal contact system is initially coated with a desired one of the aforementioned soldering fluxes. Application of the chosen soldering flux to the substrate and its associated contact system may be accomplished by any number of well known coating techniques. For example, the flux may be applied by foam, brush or spray. A preferred manner, however in which to apply the flux to a cell substrate is the brush method.

After applying the soldering flux and before tinning, the cell substrate and contact system thereon is preferably heated to a temperature substantially equal to the solder-melt temperature for a fairly short period of time, as will be discussed more fully below. The solder-melt temperatures for the various types of solder contemplated for use by the present invention are in a temperature range of from around about 25° C. to about 300° C. A particularly preferred heating range is from around about 25° C. to around about 10° C. above the solder bath temperature being used to effect assembly.

To accomplish heating, any conventional heat source that will elevate the temperature of the cell substrate and metal contact system to the desired fluxing temperature will suffice. The choice is really a matter of convenience. Thus, numerous heat sources are applicable, such as radiant electric heaters, hot air blowers, infrared lamps, soldering irons, resistance sources, power pulsing, hotplates, hotwires, infrared flames, laser heating, and furnaces. Moreover, the flux-coated substrate may even be heated by dipping the cell into a molten solder bath or by floating the cell on the surface of the bath. However, a preferred type of heat source is a belt furnace.

As previously mentioned, the substrate is heated prior to tinning for a period of time preferably substantially equal to the oxide removal time of the particular flux chosen for fluxing. The oxide removal time for the various types of fluxes contemplated for use by the present invention generally are in a range of from about ½ second to about 1,000 seconds. A particularly preferred heating time, however, is from around about ½ second to around about 2 seconds.

Upon completion of the heating process step, the substrate and the contact system thereof is tinned. To accomplish tinning, any one of the aforementioned well known tinning procedures may be utilized. A preferred tinning procedure is the solder dip.

Lastly, the etched cell is assembled by using conventional soldering procedures. Although a preferred soldering procedure is the reflow method because it is normally used in packaging thick film solar cells, the invention is not limited to this method. Thus, solder assembly may also be accomplished with any conventional solder that utilizes a flux as will occur to those skilled in the art.

The following examples serve to illustrate certain preferred embodiments of the present process invention, as well as serving to compare the electrical performances obtained from these embodiments with the electrical performance obtained from solar cells etched with the conventional hydrofluoric acid-type etchant, and are not to be construed as limiting the scope of the present invention.

EXAMPLE I

Six single crystal silicon cells are presented by the first example, five of the six cells being subjected to a soldering etch in accordance with the invention, and the remaining cell being subjected to a conventional hydrofluoric acid etch. The six cells were processed simultaneously under identical conditions. To this end, the cells were textured and diffused with phosphorus to form a p-n junction at a depth of 0.3 m and had a surface resistivity of 30Ω/sq.

The front electrical metal contacts were screen printed with Thick Film System 3347, which is a trademark for a silver paste marketed by Thick Film Systems Inc. of Santa Barbara, Calif. This paste contains about 74.6% by weight of silver, about 4.1% by weight of glass and about 21.3% by weight of organic material. A conventional automatic screen printer was used to print the thick film paste. The back contact comprised a silver-based thick film paste or ink containing about 2% aluminum which covered substantially all the back surface of the cell. The front contact covered around about from 5% to about 10% of the front surface of the cell.

After printing, the screened contact system was air dried at about 100° C. for about 10 minutes under an infrared lamp. The cells were fired in air at about 600° C. for about 6 minutes in a conventional belt furnace after the ink dried.

Immediately after the firing operation, the first I-V curves were measured for each cell. The I-V curves show the current voltage relationship for the fired cell under different conditions, such as load, illumination, and temperature. All the I-V curve measurements for Example I were accomplished with well-known equations in a well-known manner. For instance, the curves were measured by a four probe technique at 28° C. under an irradiance of 1000 W/m$^2$, which was previously provided by a simulator using type ELH bulbs. Numerical values for efficiency (n) and fill factor (FF), which are conventional indicators of cell performance, were obtained from the I-V curves using the following equations:

$$n = \frac{(Imp)(Vmp)}{A(P \text{ input})}$$

and $$FF = \frac{(Imp)(Vmp)}{(Isc)(Voc)}$$

Imp = current at the maximum power point
Vmp = voltage at the maximum power point
A = area of the cell (22.3 ccm$^2$ in this example)
P input = power input (100 mw/cm$^2$ in this example)
Isc = short-circuit current; i.e., I when V = 0
Voc = open-circuit voltages; i.e., V when I = 0

The soldering flux etching was accomplished with Kester 2331 and Kester 1587. In achieving the soldering flux etch, four cells were dipped in Kester 2331 flux and one cell was dipped in Kester 1587. All of the cells were heated to around about 215° C. before being tinned and soldered.

The four cells etched with Kester 2331 were heated by floating in a solder bath for different time periods. The first, second, third and fourth cells were heated for around about 1 second, 2 seconds, 6 seconds, and 10 seconds, respectively. The cell heated with Kester 1587 was heated for about 1 second.

The hydrofluoric acid-type etchant utilized to etch the remaining fired cell comprised an aqueous solution of about 5% by weight of hydrofluoric acid. In achieving the hydrofluoric acid etch, the remaining cell was dipped in the solution for about 8 seconds. The acid etched cell was then rinsed in deionized water for about 5 minutes and air dried.

Upon completion of both the soldering flux etch and the hydrofluoric etch, I-V curve measurements were retaken for each cell. The following electrical characteristics were obtained by etching the aforedescribed metallized silicon cells with Kester 2331 and Kester 1587 soldering fluxes and a hydrofluoric acid.

| Type of Etch Treatment | As Fired | | After Etch Treatment | |
|---|---|---|---|---|
| | n Cell Efficiency | FF Fill Factor | n Cell Efficiency | FF Fill Factor |
| HF Acid Etch Before Soldering For 8 Seconds | 3.8% | 0.32 | 6.6% | 0.46 |
| Kester 1587 Soldering Flux Etch For 1 Second at 215° C. | 3.0% | 0.29 | 5.0% | 0.38 |
| Kester 2331 Soldering Flux Etch For 1 Second at 215° C. | 6.6% | 0.46 | 9.3% | 0.62 |
| Kester 2331 Soldering Flux Etch For 2 Seconds at 215° C. | 1.9% | 0.27 | 6.3% | 0.46 |
| Kester 2331 Soldering Flux Etch For 6 Seconds at 215° C. | 4.8% | 0.35 | 8.3% | 0.57 |
| Kester 2331 Soldering Flux Etch For 10 Seconds at 215° C. | 5.0% | 0.35 | 9.0% | 0.61 |

EXAMPLE II

Example II demonstrates practicing the instant invention with a different type of thick film ink. Four single crystal silicon cells were metallized with Electro-Oxide 6107. Electro-Oxide 6107 is a trademark for a silver ink marketed by Electro-Oxide Corporation of West Palm Beach, Fla. The four cells were fabricated and tested in substantially the same manner as the six silicon cells of Example I. A first difference between the two examples is that Electro-Oxide 6107 contains around about 82.6% by weight of silver, 1.2% by weight of glass and 16.1% by weight of organic material. Another difference between the two examples is that all of the cells of this Example were etched with Kester fluxes.

The following electrical characteristics were obtained by etching the Electro-Oxide, metallized, contact, systems of the aforedescribed silicon cells.

| Type of Etch Treatment | As Fired | | After Etch Treatment | |
|---|---|---|---|---|
| | n Cell Efficiency | FF Fill Factor | n Cell Efficiency | FF Fill Factor |
| Kester 1587 Soldering Flux Etch for 1 Second at 215° C. | 7.8% | 0.50 | 11.2% | 0.71 |
| Kester 2331 Soldering Flux Etch for 1 Second at 215° C. | 7.6% | 0.48 | 11.4% | 0.71 |
| Kester 2331 Soldering Flux Etch for 6 Seconds at 215° C. | 7.7% | 0.50 | 11.0% | 0.70 |
| Kester 2331 Soldering Flux Etch for 10 Seconds at 215° C. | 7.4% | 0.47 | 11.0% | 0.70 |

Although the aforegoing examples illustrate an improved process for reducing the series cell resistance of only single crystal silicon solar cells applicable for terrestrial applications, it will be appreciated that the process of the present invention may be employed for reducing the series cell resistance for other types of thick film metallized solar cells as well.

From the aforegoing, it may now be appreciated that the power output of a thick film, solar cell, metal contact system after firing is advantageously substantially improved after etching with a soldering flux. Moreover, it may be further appreciated that the improvements in power output obtained from such an etched solar cell is usually substantially equal to the improvements realized by employing a hydrofluoric acid-type etchant.

Furthermore, it will now be apparent that it was also both unexpected and surprising that a post-soldering flux-etched cell would advantageously provide an increased efficiency and reduced cell resistance substantially equal to the increased efficiencies and reduced series resistance obtained by etching the contact systems with hydrofluoric acid. Additionally, from the aforesaid, it will now also be apparent that it was both unexpected and surprising that the employment of the soldering flux as both an etchant and a fluxing agent would substantially and advantageously reduce the contact resistance and simultaneously remove the oxide coatings during the latter soldering stages, such that the etching cycle could be advantageously integrally incorporated into the soldering cycle so as to save a costly acid etching process step.

For example, the only additional cost attributable to the soldering cycle when using a soldering flux etchant arises from the extra time required to accomplish the single etching and fluxing operation. In sharp contrast to this, the additional cost attributable to the hydrofluoric acid etching cycle arises out of the extra time it takes to perform the etching, as well as from the use of special rinsing tanks, special drying lines' and skilled etching personnel or operators. Presently it is estimated that, the cost of the extra acid etching operation for a batch hydrofluoric acid etch treatment is around about $0.18 per peak watt, whereas the extra cost for the soldering etch treatment of the present invention is around about $0.02 per peak watt.

The foregoing description of the preferred embodiments of the present invention have been presented for purpose of illustration and description. It is not intended to be exhaustive or to limit the present invention to the precise forms disclosed, and obviously many modifications and variations are possible in the light of the above teaching. The embodiments were chosen and described in order to explain best the principles of the invention and its practical application and thereby to enable others skilled in the art to best utilize the invention and various embodiments and with various modifications as are suited to the particular use contemplated. It is intended that the scope of the invention be defined by the claims appended hereto.

We claim:

1. A process for substantially reducing the series resistance of a solar cell having a thick film metal contact assembly thereon while simultaneously removing metal oxides from the surface of said contact assembly prior to applying solder thereon without a need to etch said oxides with a hydrofluoric acid, said process comprising the steps of:
   (a) applying a flux to said solar cell contact assembly;
   (b) removing said series resistance associated with said thick film contact assembly without using said hydrofluoric acid to etch said metal oxides by heating said cell for a period of time sufficient to cause said flux to substantially etch away said metal oxides from said surface of said assembly during said heating.

2. A process as recited in claim 1, wherein said flux is an organic soldering flux.

3. A process as recited in claim 1, wherein said flux is an inorganic soldering flux.

4. A process as recited in claim 1, wherein said cell is heated to a first temperature substantially equal to a second temperature used to apply said solder to said assembly.

5. A process as recited in claim 1, wherein a range of said period of time in which said flux is heated is from about 1 second to about 1000 seconds.

6. A process as recited in claim 4, wherein a range of said first temperature for heating said flux is from about 25° C. to about 300° C.

7. A thick film metallization process for solar cells, said process comprising the steps of:
   (a) depositing a thick film material onto a semiconductor substrate to form a conductor assembly thereon, said thick film material including metal oxides and a frit-like material;
   (b) heating said substrate and said thick film material sufficient to form a glaze-like film between said substrate and said thick film material, said film causing said metal oxides to be bonded to said substrate;
   (c) applying a flux to said conductor assembly defined by said thick film material deposited on said substrate;
   (d) substantially removing a series resistance associated with said thick film material defined by said conductor assembly while substantially removing said oxides from said surface of said thick film material without a need to etch said metal oxides with a hydrofluoric etchant by heating said conductor assembly to a first temperature for a period of time sufficient to cause said flux to substantially etch away said metal oxides during said heating; and
   (e) soldering said conductor assembly to an electrical assembly to form a functional solar cell, said first temperature being substantially equal to a solder-melt temperature for a desired solder subsequently applied to said assembly.

8. A thick film metallization process as recited in claim 7, wherein said flux is an organic flux.

9. A thick film metallization process as recited in claim 7, wherein said flux is an inorganic flux.

10. A thick film metallization process as recited in claim 9, wherein a range of first period of time in which said conductor assembly is heated is from about 1 second to about 1000 seconds.

11. A thick film metallization process as recited in claim 10, wherein a range of said first temperature for heating said flux is from about 25° C. to about 300° C.

* * * * *